United States Patent
Das et al.

(10) Patent No.: US 12,074,920 B2
(45) Date of Patent: Aug. 27, 2024

(54) APPARATUS, METHODS, AND COMPUTER PROGRAMS

(71) Applicant: NOKIA SOLUTIONS AND NETWORKS OY, Espoo (FI)

(72) Inventors: Prashanti Das, Bangalore (IN); Bruno Landais, Pleumeur-Bodou (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 207 days.

(21) Appl. No.: 17/507,146

(22) Filed: Oct. 21, 2021

(65) Prior Publication Data
US 2022/0131911 A1 Apr. 28, 2022

(30) Foreign Application Priority Data

Oct. 23, 2020 (IN) .............................. 202011046294

(51) Int. Cl.
*H04L 65/1073* (2022.01)
*H04L 65/1045* (2022.01)
*H04W 48/16* (2009.01)

(52) U.S. Cl.
CPC ...... *H04L 65/1073* (2013.01); *H04L 65/1045* (2022.05); *H04W 48/16* (2013.01)

(58) Field of Classification Search
CPC . H04W 48/20; H04L 65/1073; H04L 65/1045
See application file for complete search history.

(56) References Cited

U.S. PATENT DOCUMENTS

| | | | |
|---|---|---|---|
| 2018/0007612 A1* | 1/2018 | Jahangir | ............... H04L 61/503 |
| 2020/0092424 A1* | 3/2020 | Qiao | ....................... H04L 12/14 |
| 2020/0236148 A1 | 7/2020 | Afzal et al. | |
| 2020/0267784 A1 | 8/2020 | Bharatia et al. | |

FOREIGN PATENT DOCUMENTS

| | | |
|---|---|---|
| CN | 109274512 A | 1/2019 |
| CN | 110086757 A | 8/2019 |
| WO | WO 2019/150324 A1 | 8/2019 |
| WO | 2020/204774 A1 | 10/2020 |

OTHER PUBLICATIONS

Communication pursuant to Article 94(3) EPC dated May 31, 2023, corresponding to European Patent Application No. 21203639.6.
Extended European Search Report dated Feb. 28, 2022 corresponding to European Patent Application No. 21203639.6.
Nokia et al., "P-CSCF addresses," 3GPP Draft; C4-205161, 3GPP TSG-CT WG4 Meeting #101e, E-Meeting, Nov. 3-13, 2020, Oct. 26, 2020, XP051947192.
Chinese Office Action issued in corresponding Chinese Patent Application No. 2021112395064 on May 23, 2024.

* cited by examiner

*Primary Examiner* — Diane D Mizrahi
(74) *Attorney, Agent, or Firm* — SQUIRE PATTON BOGGS (US) LLP (57) ABSTRACT

There is provided an apparatus for a Proxy Call Session Control Function (P-CSCF), the apparatus being arranged to send a first registration request to a network repository function for registering the P-CSCF with the network repository function, the first registration request comprising at least one first identifier for the P-CSCF over an interface between the P-CSCF and a user equipment.

15 Claims, 6 Drawing Sheets

APPARATUS, METHODS, AND COMPUTER PROGRAMS

CROSS REFERENCE TO RELATED APPLICATION

This application claims the benefit of Indian Application No. 202011046294, filed Oct. 23, 2020. The entire content of the above-referenced application is hereby incorporated by reference.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G radio or new radio (NR) access technology.

SUMMARY

According to a first aspect, there is provided an apparatus for a Proxy Call Session Control Function (P-CSCF), the apparatus comprising: means for sending a first registration request to a network repository function for registering the P-CSCF with the network repository function, the first registration request comprising at least one first identifier for the P-CSCF over an interface between the P-CSCF and a user equipment.

The apparatus may comprise means for sending a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The first registration request may comprise at least one of a data network name and a network slice identifier associated with the at least one first identifier.

The at least one first identifier may comprise at least one of a fully qualified domain name, an IPv6 address, and an IPv4 address.

According to a second aspect, there is provided an apparatus for a network repository function, the apparatus comprising: means for receiving a first registration request from a Proxy Call Session Control Function (P-CSCF), the first registration request comprising at least one first identifier for the P-CSCF over an interface between the P-CSCF and a user equipment; and means for registering the P-CSCF using the at least one first identifier.

The apparatus may comprise means for receiving a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The apparatus may comprise means for receiving a discovery request for a P-CSCF from a session management function on behalf of a user equipment; and means for providing the at least one first identifier to the session management function in response to the discovery request.

The first registration request may comprise at least one of a data network name and a network slice identifier associated with the at least one first identifier.

The apparatus may comprise means for storing the at least one of a data network name and/or a network slice identifier with the associated at least one first identifier.

The apparatus may comprise: means for receiving a discovery request for a P-CSCF from a session management function on behalf of a user equipment; means for using the at least one of a data network name and a network slice identifier to select the at least one first identifier; and means for providing the at least one first identifier to the session management function in response to the discovery request.

The at least one first identifier may comprise at least one of a fully qualified domain name, an IPv6 address, and an IPv4 address.

According to a third aspect, there is provided an apparatus for a session management function, the apparatus comprising: means for receiving from a network repository function a profile for at least one Proxy Call Session Control Function (P-CSCF); means for selecting at least one first identifier for the P-CSCF over an interface between the P-CSCF and a user equipment; and means for providing the selected at least one first identifier to the user equipment.

The profile may comprise at least one second identifier for the P-CSCF for use by network functions in a core network comprising the network repository function. The at least one first identifier may be different to the at least one second identifier.

The apparatus may comprise means for sending a request to the network repository function to be notified when a change is made to the profile at the network repository function.

The apparatus may comprise means for sending a request to the network repository function for identifying at least one P-CSCF for facilitating provision of a service to the user equipment.

The profile may comprise at least one of a data network name and a network slice identifier associated with the at least one first identifier. The means for selecting at least one first identifier may perform said selecting using at least one of said data network name and network slice identifier.

The at least one first identifier may comprise at least one of a fully qualified domain name, an IPv6 address, and an IPv4 address.

According to a fourth aspect, there is provided an apparatus for a Proxy Call Session Control Function (P-CSCF), the apparatus comprising at least one processor, and at least one memory comprising code that, when executed by the at least one processor, causes the apparatus to: send a first registration request to a network repository function for registering the P-CSCF with the network repository function, the first registration request comprising at least one first identifier for the P-CSCF over an interface between the P-CSCF and a user equipment.

The apparatus may be caused to send a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The first registration request may comprise at least one of a data network name and a network slice identifier associated with the at least one first identifier.

The at least one first identifier may comprise at least one of a fully qualified domain name, an IPv6 address, and an IPv4 address.

According to a fifth aspect, there is provided an apparatus for a network repository function, the apparatus comprising at least one processor and at least one memory comprising code that, when executed by the at least one processor, causes the apparatus to: receive a first registration request from a Proxy Call Session Control Function (P-CSCF), the first registration request comprising at least one first identifier for the P-CSCF over an interface between the P-CSCF and a user equipment; and register the P-CSCF using the at least one first identifier.

The apparatus may be caused to receive a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The apparatus may be caused to receive a discovery request for a P-CSCF from a session management function on behalf of a user equipment; and provide the at least one first identifier to the session management function in response to the discovery request.

The first registration request may comprise at least one of a data network name and a network slice identifier associated with the at least one first identifier.

The apparatus may be caused to store the at least one of a data network name and/or a network slice identifier with the associated at least one first identifier.

The apparatus may be caused to: receive a discovery request for a P-CSCF from a session management function on behalf of a user equipment; use the at least one of a data network name and a network slice identifier to select the at least one first identifier; and provide the at least one first identifier to the session management function in response to the discovery request.

The at least one first identifier may comprise at least one of a fully qualified domain name, an IPv6 address, and an IPv4 address.

According to a sixth aspect, there is provided an apparatus for a session management function, the apparatus comprising at least one processor and at least one memory comprising code that, when executed by the at least one processor, causes the apparatus to: receive from a network repository function a profile for at least one Proxy Call Session Control Function (P-CSCF); select at least one first identifier for the P-CSCF over an interface between the P-CSCF and a user equipment; and provide the selected at least one first identifier to the user equipment.

The profile may comprise at least one second identifier for the P-CSCF for use by network functions in a core network comprising the network repository function. The at least one first identifier may be different to the at least one second identifier.

The apparatus may be caused to send a request to the network repository function to be notified when a change is made to the profile at the network repository function.

The apparatus may be caused to send a request to the network repository function for identifying at least one P-CSCF for facilitating provision of a service to the user equipment.

The profile may comprise at least one of a data network name and a network slice identifier associated with the at least one first identifier. The selecting at least one first identifier may comprise using at least one of said data network name and network slice identifier.

The at least one first identifier may comprise at least one of a fully qualified domain name, an IPv6 address, and an IPv4 address.

According to a seventh aspect, there is provided a method for an apparatus for a Proxy Call Session Control Function (P-CSCF), the method comprising: sending a first registration request to a network repository function for registering the P-CSCF with the network repository function, the first registration request comprising at least one first identifier for the P-CSCF over an interface between the P-CSCF and a user equipment.

The method may comprise sending a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The first registration request may comprise at least one of a data network name and a network slice identifier associated with the at least one first identifier.

The at least one first identifier may comprise at least one of a fully qualified domain name, an IPv6 address, and an IPv4 address.

According to an eighth aspect, there is provided a method for an apparatus for a network repository function, the method comprising: receiving a first registration request from a Proxy Call Session Control Function (P-CSCF), the first registration request comprising at least one first identifier for the P-CSCF over an interface between the P-CSCF and a user equipment; and registering the P-CSCF using the at least one first identifier.

The method may comprise receiving a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The method may comprise receiving a discovery request for a P-CSCF from a session management function on behalf of a user equipment; and providing the at least one first identifier to the session management function in response to the discovery request.

The first registration request may comprise at least one of a data network name and a network slice identifier associated with the at least one first identifier.

The method may comprise storing the at least one of a data network name and/or a network slice identifier with the associated at least one first identifier.

The method may comprise: receiving a discovery request for a P-CSCF from a session management function on behalf of a user equipment; using the at least one of a data network name and a network slice identifier to select the at least one first identifier; and providing the at least one first identifier to the session management function in response to the discovery request.

The at least one first identifier may comprise at least one of a fully qualified domain name, an IPv6 address, and an IPv4 address.

According to a ninth aspect, there is provided a method for an apparatus for a session management function, the method comprising: receiving from a network repository function a profile for at least one Proxy Call Session Control Function (P-CSCF); selecting at least one first identifier for the P-CSCF over an interface between the P-CSCF and a user equipment; and providing the selected at least one first identifier to the user equipment.

The profile may comprise at least one second identifier for the P-CSCF for use by network functions in a core network comprising the network repository function. The at least one first identifier may be different to the at least one second identifier.

The method may comprise sending a request to the network repository function to be notified when a change is made to the profile at the network repository function.

The method may comprise sending a request to the network repository function for identifying at least one P-CSCF for facilitating provision of a service to the user equipment.

The profile may comprise at least one of a data network name and a network slice identifier associated with the at least one first identifier. The selecting at least one first identifier may comprise selecting using at least one of said data network name and network slice identifier.

The at least one first identifier may comprise at least one of a fully qualified domain name, an IPv6 address, and an IPv4 address.

According to a tenth aspect, there is provided an apparatus for a Proxy Call Session Control Function (P-CSCF), the apparatus comprising: sending circuitry for sending a first registration request to a network repository function for registering the P-CSCF with the network repository function, the first registration request comprising at least one first identifier for the P-CSCF over an interface between the P-CSCF and a user equipment.

The apparatus may comprise sending circuitry for sending a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The first registration request may comprise at least one of a data network name and a network slice identifier associated with the at least one first identifier.

The at least one first identifier may comprise at least one of a fully qualified domain name, an IPv6 address, and an IPv4 address.

According to an eleventh aspect, there is provided an apparatus for a network repository function, the apparatus comprising: receiving circuitry for receiving a first registration request from a Proxy Call Session Control Function (P-CSCF), the first registration request comprising at least one first identifier for the P-CSCF over an interface between the P-CSCF and a user equipment; and registering circuitry for registering the P-CSCF using the at least one first identifier.

The apparatus may comprise receiving circuitry for receiving a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The apparatus may comprise receiving circuitry for receiving a discovery request for a P-CSCF from a session management function on behalf of a user equipment; and providing circuitry for providing the at least one first identifier to the session management function in response to the discovery request.

The first registration request may comprise at least one of a data network name and a network slice identifier associated with the at least one first identifier.

The apparatus may comprise storing circuitry for storing the at least one of a data network name and/or a network slice identifier with the associated at least one first identifier.

The apparatus may comprise: receiving circuitry for receiving a discovery request for a P-CSCF from a session management function on behalf of a user equipment; using circuitry for using the at least one of a data network name and a network slice identifier to select the at least one first identifier; and providing circuitry for providing the at least one first identifier to the session management function in response to the discovery request.

The at least one first identifier may comprise at least one of a fully qualified domain name, an IPv6 address, and an IPv4 address.

According to a twelfth aspect, there is provided an apparatus for a session management function, the apparatus comprising: receiving circuitry for receiving from a network repository function a profile for at least one Proxy Call Session Control Function (P-CSCF); selecting circuitry for selecting at least one first identifier for the P-CSCF over an interface between the P-CSCF and a user equipment; and providing circuitry for providing the selected at least one first identifier to the user equipment.

The profile may comprise at least one second identifier for the P-CSCF for use by network functions in a core network comprising the network repository function. The at least one first identifier may be different to the at least one second identifier.

The apparatus may comprise sending circuitry for sending a request to the network repository function to be notified when a change is made to the profile at the network repository function.

The apparatus may comprise sending circuitry for sending a request to the network repository function for identifying at least one P-CSCF for facilitating provision of a service to the user equipment.

The profile may comprise at least one of a data network name and a network slice identifier associated with the at least one first identifier. The selecting circuitry for selecting at least one first identifier may perform said selecting using at least one of said data network name and network slice identifier.

The at least one first identifier may comprise at least one of a fully qualified domain name, an IPv6 address, and an IPv4 address.

According to a thirteenth aspect, there is provided non-transitory computer readable medium comprising program instructions for causing an apparatus for a Proxy Call Session Control Function (P-CSCF) to perform at least the following: send a first registration request to a network repository function for registering the P-CSCF with the network repository function, the first registration request comprising at least one first identifier for the P-CSCF over an interface between the P-CSCF and a user equipment.

The apparatus may be caused to send a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The first registration request may comprise at least one of a data network name and a network slice identifier associated with the at least one first identifier.

The at least one first identifier may comprise at least one of a fully qualified domain name, an IPv6 address, and an IPv4 address.

According to a fourteenth aspect, there is provided non-transitory computer readable medium comprising program instructions for causing an apparatus for a network repository function to perform at least the following: receive a first registration request from a Proxy Call Session Control Function (P-CSCF), the first registration request comprising at least one first identifier for the P-CSCF over an interface between the P-CSCF and a user equipment; and register the P-CSCF using the at least one first identifier.

The apparatus may be caused to receive a second registration request to the network repository function, wherein the second registration request comprises at least one second identifier for the P-CSCF for use by network functions in a core network comprising the network repository function. The first registration request may be comprised within the second registration request. The at least one first identifier may be different to the at least one second identifier.

The apparatus may be caused to receive a discovery request for a P-CSCF from a session management function on behalf of a user equipment; and provide the at least one first identifier to the session management function in response to the discovery request.

The first registration request may comprise at least one of a data network name and a network slice identifier associated with the at least one first identifier.

The apparatus may be caused to store the at least one of a data network name and/or a network slice identifier with the associated at least one first identifier.

The apparatus may be caused to: receive a discovery request for a P-CSCF from a session management function on behalf of a user equipment; use the at least one of a data network name and a network slice identifier to select the at least one first identifier; and provide the at least one first identifier to the session management function in response to the discovery request.

The at least one first identifier may comprise at least one of a fully qualified domain name, an IPv6 address, and an IPv4 address.

According to a fifteenth aspect, there is provided non-transitory computer readable medium comprising program instructions for causing an apparatus for a session management function to perform at least the following: receive from a network repository function a profile for at least one Proxy Call Session Control Function (P-CSCF); select at least one first identifier for the P-CSCF over an interface between the P-CSCF and a user equipment; and provide the selected at least one first identifier to the user equipment.

The profile may comprise at least one second identifier for the P-CSCF for use by network functions in a core network comprising the network repository function. The at least one first identifier may be different to the at least one second identifier.

The apparatus may be caused to send a request to the network repository function to be notified when a change is made to the profile at the network repository function.

The apparatus may be caused to send a request to the network repository function for identifying at least one P-CSCF for facilitating provision of a service to the user equipment.

The profile may comprise at least one of a data network name and a network slice identifier associated with the at least one first identifier. The selecting at least one first identifier may comprise using at least one of said data network name and network slice identifier.

The at least one first identifier may comprise at least one of a fully qualified domain name, an IPv6 address, and an IPv4 address.

According to a sixteenth aspect, there is provided a computer program comprising program instructions for causing a computer to perform any method as described above.

According to a seventeenth aspect, there is provided a computer program product stored on a medium may cause an apparatus to perform any method as described herein.

According to an eighteenth aspect, there is provided an electronic device that may comprise apparatus as described herein.

According to a nineteenth aspect, there is provided a chipset that may comprise an apparatus as described herein.

Various other aspects are also described in the following detailed description and in the attached claims.

BRIEF DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a 5G wireless communication system are briefly explained with reference to FIG. 1.

Figure 1:
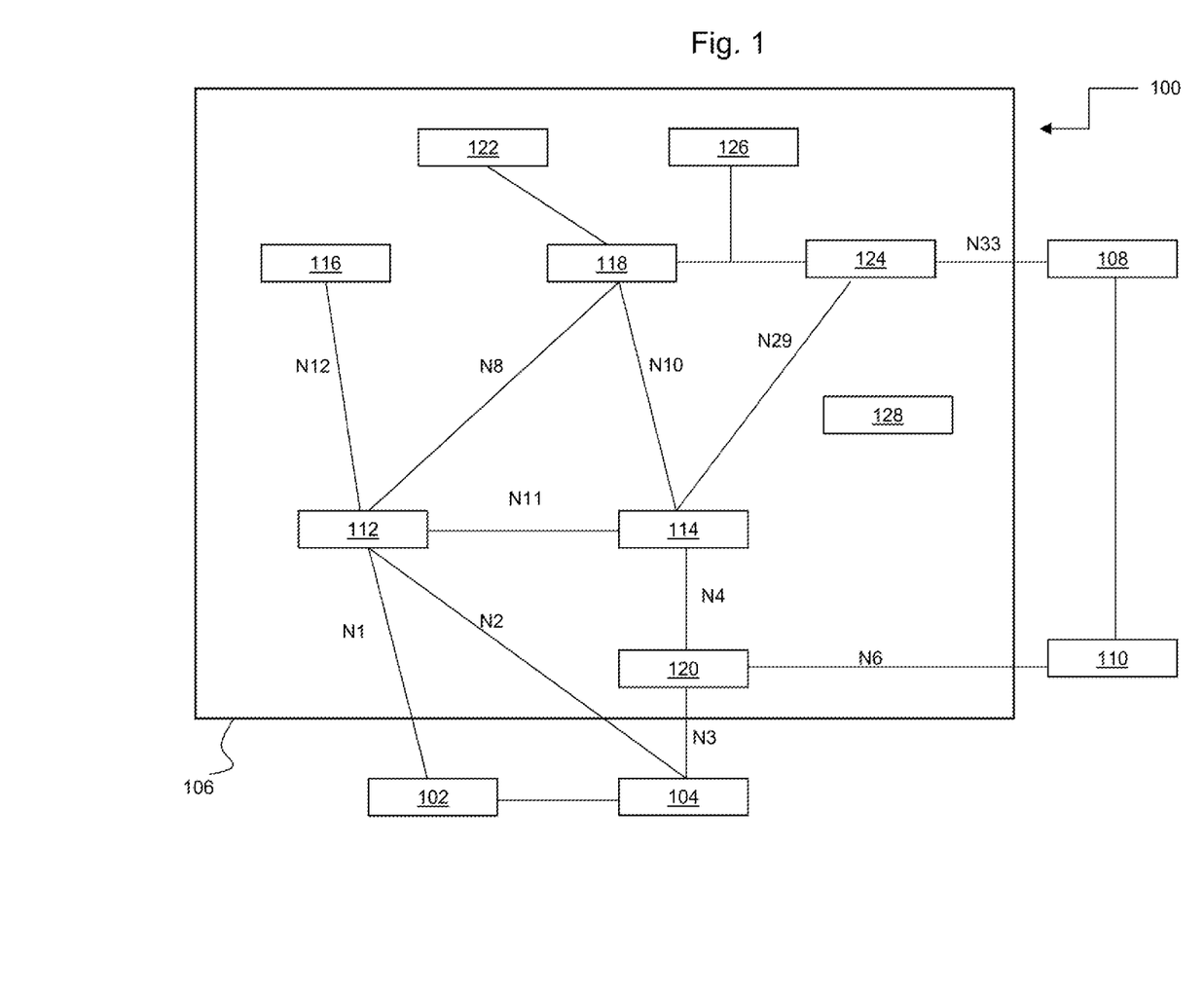
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) centralized unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The 5GC (5G Core network) has been defined as a Service Based Architecture (SBA). Service-Based Architectures provide a modular framework from which common applications can be deployed using components of varying sources and suppliers. Control plane functionality and common data repositories of a 5G network may thus be delivered by way of a set of interconnected Network Functions (NFs), each with authorization to access each other's services, with Network Function (NF) service producers exposing services to NF service consumers. NFs may act as service consumers and/or service providers. NF service providers register their NF profile in a Network Repository Function (NRF). An NRF maintains an updated repository of 5G elements available in the operator's network, along with the services provided by each of the elements in the 5G core that are expected to be instantiated, scaled and/or terminated without or minimal manual intervention. In other words, the NRF maintains a record of available NF instances and their supported services. The NRF allows other NF instances to subscribe and be notified of registrations from NF instances of a given type. The NRF may support service discovery, by receipt of Discovery Requests from NF instances and details which NF instances support specific services. Therefore NF Service consumers or Service Communication Proxies (SCP) (which obtain NF services on behalf of another network entity) may discover NF service producers by performing for example, an NF Discovery procedure towards the NRF.

The Internet Protocol (IP) Multimedia Subsystem (IMS) is an architectural framework for delivering IP multimedia services. IMS often uses Internet Engineering Task Force protocols (e.g., the Session Initiation Protocol (SIP)). IMS is not intended to standardize applications across a communication network, but rather to aid the access of multimedia and voice applications from wireless and wireline terminals. This may be implemented by, for example, having a horizontal control layer that isolates the access network from the service layer in the 3GPP network. From a logical architecture perspective, services need not have their own control functions, as the control layer is a common horizontal layer.

Figure 5:
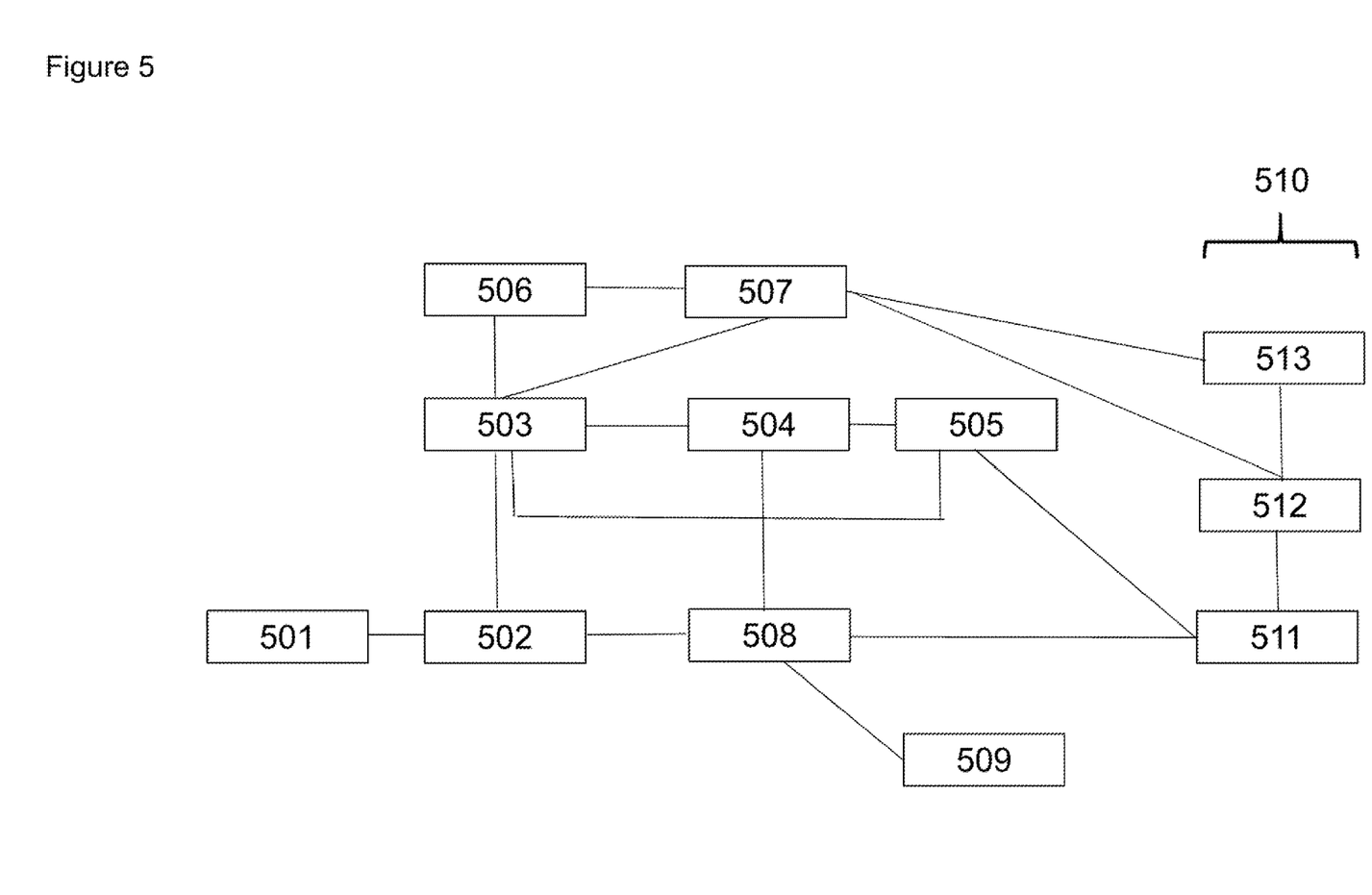
FIG. 5 shows a schematic representation of a system architecture.

FIG. 5 is a schematic diagram of an example of an IMS architecture that interfaces with a 5GS architecture. It is understood that, like FIG. 1, the arrangement of FIG. 5 is merely illustrative, and omits several network features to assist in clarity.

FIG. 5 shows a UE 501 that accesses a 5G core network through access point 502. The access point may interface with AMF 503, which may interface with SMF 504, Policy Control Function (PCF) 505, AUSF 506 and UDM 507. The SMF 504 further comprises interfaces to the UDM 507, PCF 505 and a user plane function (UPF) 508. The PCF 505 further comprises interfaces to a P-CSCF 511 in an IMS network/infrastructure 510. The AUSF 506 further comprises an interface to the UDM 507. The UDM 507 further comprises an interface to a Telephony Application Server (TAS) 512 in the IMS architecture 510 and to at least one of an Interrogating-CSCF (I-CSCF) and a Serving Call Selection Control Function (S-CSCF) 513. The access point 502 may also interface with the UPF 508. The UPF 508 may interface with a data network 509 that may provide a service to the UE 501. The UPF 508 may further interface with the IMS network/infrastructure 510 through P-CSCF 511 for providing a service to the UE 501. The P-CSCF 511 may interface with the I-CSCF/S-CSCF 513, which may in turn interface with TAS 512.

Each of the CSCFs 511, 513 shown in FIG. 5 are used to process SIP signaling packets in the IMS architecture, with the P-CSCF 511 acting as a first point of contact for the IMS terminal accessing the IMS architecture 510. The terminal accessing the IMS architecture may be, for example, a network entity in the core network and/or a user equipment). As the P-CSCF 511 acts as a first point of contact, the IMS terminal uses a mechanism for discovering it.

Considering the case when the IMS terminal is a UE, in 4G and 5G systems, the UE 501 may discover the P-CSCF's 511 address through non-access stratum signalling via Protocol Configuration-Option Information element sent by the Packet Data Gateway (PGW) or through the Session Management Function (SMF) serving the UE's IMS Packet Data Network (PDN) connection or Protocol Data Unit (PDU) session. The PGW and SMF may be configured with P-CSCF's addresses. Alternatively, in the 5GS, a Network Function (NF) discovery functionality is provided in the NF Repository Function (NRF) that enables NRF-based P-CSCF address discovery. In particular, the 5G SMF 504 may discover the P-CSCF's 511 address through the NRF provided the P-CSCF has registered its profile at the NRF. In other words, the NRF may store (or otherwise be able to access) a P-CSCF profile for a registered P-CSCF. The SMF 504 can then discover the P-CSCF through the NRF and learn the P-CSCF address from the P-CSCF profile at the NRF. The address may be, for example, in the form of a fully qualified domain name (FQDN) and/or in the form of an Internet Protocol (IP) address, such as IPv4 and/or IPv6.

For example, P-CSCF selection functionality may be used by a SMF to select the P-CSCF for an IMS PDU Session of the UE. The SMF can utilize the Network Repository Function to discover the P-CSCF instance(s). The NRF provides the IP address and/or the FQDN of P-CSCF instance(s) to the SMF. The P-CSCF selection function in the SMF selects the P-CSCF instance(s) based on the available P-CSCF instances obtained from NRF or based on the configured P-CSCF information in the SMF. If the SMF receives FQDN(s) from the NRF or is configured with FQDN(s) the SMF may resolve these to IP addresses for sending to the UE in the Protocol Data Unit (PDU) session response.

The following recognizes that as the P-CSCF is an edge node of IMS, the IP address it wants to expose towards UEs can be totally different than the IP addresses it exposes towards other Network Functions. The interface between the UE and the P-CSCF may be referred to as the Gm interface in current terminology. This Gm interface may thus be used to exchange messages between SIP user equipment (UE) or Voip gateway and the P-CSCF, with identifiers/addresses being used over this interface being referred to as Gm addresses.

Moreover, the UE communicates with P-CSCF over a SIP interface whereas the IP address which P-CSCF includes in its profile is for Service-based interface (SBI) message exchange purposes with network functions in the 5GC. For example, the P-CSCF may supports session border control functionality in which the IP address towards UE can be an IPv6 address while the IP address towards other Network elements can be an IPv4 address. The existing standards thus lack mechanisms for the P-CSCF to register Gm IP addresses in its profile in NRF, especially when the Gm IP addresses are different from the P-CSCF's IP addresses used for communications with other 5GC NFs. This may lead to security challenges and IP interworking challenges.

The following discloses a P-CSCF that registers information on at least one address for the Gm interface at an NRF in addition to information on at least one (different) address for NFs to address the P-CSCF. For example, the Gm address information may comprise at least one of: a FQDN for the P-CSCF for the Gm interface, one IPv4 address for the P-CSCF for the Gm interface, and one IPv6 address for the P-CSCF for Gm interface. This Gm address information may be registered within the P-CSCF Profile for that P-CSCF at the NRF. One way of doing this is by modifying the current definition of the "PcscfInfo" information element. For example, this information element may be modified to include at least one of the following attributes providing Gm addressing information of the P-CSCF: Gm Fqdn which is of type FQDN; Gm Ipv4 Addresses which is of type array(Ipv4Addr); and Gm Ipv6 Addresses which is of type array(Ipv6Addr).

The SMF may consider the Gm address details for conveying P-CSCF address towards the UE. The existing IP address in the P-CSCF profile may be used only for SBI interface message exchange purpose (e.g. for network function/core network addressing of the P-CSCF).

The following also proposes the option for the P-CSCF to register different Gm address information per Data Network Name (DNN) and/or per network slice, to provide more flexibility to operators.

A network slice may be considered to be an independent end-to-end logical network that runs on a shared physical infrastructure. A network slice may comprise dedicated and/or shared resources, e.g. in terms of processing power, storage, and bandwidth.

In practice, registering different Gm address information per Data Network Name (DNN) and/or per network slice may be performed using the absence of the "pcscfInfoList" attribute in a P-CSCF profile to indicate that the P-CSCF associated with the P-CSCF profile can be selected for any Data Network Name and Access Type, with the P-CSCF Gm Address being same as the P-CSCF address in the NF Profile. Alternatively, this may be performed by extending the pcscfInfo attribute within the P-CSCF profile registered in NRF with Gm addressing information (as described previously) per DNN and/or per network slice.

Figure 6:
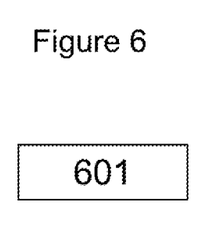
FIGS. 6 to 8 are flow charts illustrating potential operations that may be performed by apparatuses described herein.
Figure 7:
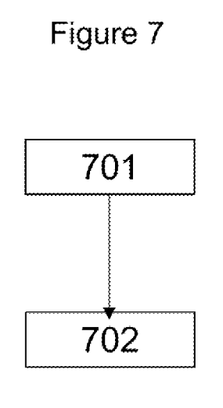
Figure 8:
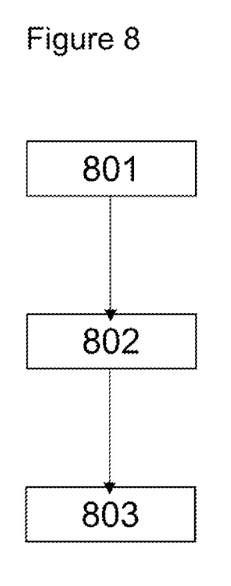

The following illustrates some potential operations of a P-CSCF and NRF with reference to the flow charts of FIGS. 6 to 8.

FIG. 6 illustrates potential operations that may be performed by an apparatus providing a P-CSCF functionality.

At 601, the P-CSCF sends a first registration request to a network repository function for registering the P-CSCF with the network repository function. The first registration request may comprise at least one first identifier for the P-CSCF over an interface between the P-CSCF and a user equipment. This interface between the P-CSCF and the user equipment may be a Gm interface.

The at least one first identifier may comprise at least one of a fully qualified domain name, an IPv6 address, and an IPv4 address. The at least one first identifier may comprise multiple identifiers for the interface between the P-CSCF and a user equipment.

The at least one first identifier may be provided with an indication that it is an identifier for the Gm interface. This indication may be provided in the form of the at least one identifier being provided in a particular/designated information element in the registration request.

The at least one first identifier may be provided in the form of a list.

The P-CSCF may send a second registration request to the network repository function. The second registration request comprises at least one second identifier for the P-CSCF for use by network functions in a core network comprising the network repository function. These at least one second identifiers may be different to the at least one first identifiers. The first registration request and the second registration request may be sent as part of the same message and/or data packet. To this effect, the first registration request may be said to be comprised within the second registration request.

The first registration request may comprise a data network name or a network slice identifier associated with the at least one first identifier. To this effect, the P-CSCF may send multiple sets of "at least one first identifier", each set having a respective different data network name or network slice identifier. There need not be the same number of identifiers in each set, merely that each set be associated with a data network name or network slice identifier and be used for a Gm interface. These different sets may thus then be used in different data networks or network slices, with the network repository function using the data network names or network slice identifiers to determine which set of "at least one network name or network slice identifier" to provide in response to a request for a P-CSCF identifier. Alternatively or additionally, these different sets may be used in different data networks or network slices, with a network function and/or a session management function using the data network names or network slice identifiers received in the P-CSCF profile discovered from the NRF to determine which set of "at least one network name or network slice identifier" to use as Gm address for the UE.

FIG. 7 illustrates potential operations that may be performed by an apparatus providing the functionality of a network repository function in a core network. This apparatus may interact with the apparatus of FIG. 6.

At 701, the NRF receives a first registration request from a Proxy Call Session Control Function (P-CSCF). The first registration request may comprise at least one first identifier for the P-CSCF over an interface between the P-CSCF and a user equipment. This interface may be a Gm interface.

The at least one first identifier may comprise at least one of a fully qualified domain name, an IPv6 address, and an IPv4 address. The at least one first identifier may comprise multiple identifiers for the interface between the P-CSCF and a user equipment.

The at least one first identifier may be provided with an indication that it is an identifier for the Gm interface. This indication may be provided in the form of the at least one identifier being provided in a particular/designated information element in the registration request.

The at least one first identifier may be provided in the form of a list.

At 702, the NRF registers the P-CSCF using the at least one first identifier. In this way, the NRF may add to (or create) a profile for the P-CSCF that may be used by the NRF to provide at least one identifier for the P-CSCF to at least one other network entity, such as a network function and/or a session management function.

The NRF may receive a second registration request. The second registration request may comprise at least one second identifier for the P-CSCF for use by network functions in a core network comprising the network repository function. These at least one second identifiers may be different to the at least one first identifiers. The first registration request and the second registration request may be sent as part of the same message and/or data packet. To this effect, the first registration request may be said to be comprised within the second registration request.

The first registration request may comprise a data network name or network slice identifier associated with the at least one first identifier. To this effect, the NRF may receive multiple sets of "at least one first identifier" in respect of a single P-CSCF, each set having a respective different data network name or network slice identifier. There need not be the same number of identifiers in each set, merely that each set be associated with a data network name and be used for a Gm interface. These different sets may thus then be used in different data networks, with the network repository function using the data network names or network slice identifiers to determine which set of "at least one network name or network slice identifier" to provide in response to a request for a P-CSCF identifier. The NRF may store the data network name or network slice identifier with the associated at least one first identifier. For example, the NRF may store the data network name or network slice identifier as part of the profile for the P-CSCF.

FIG. 8 illustrates potential operations that may be performed by an apparatus providing functionality of a session management function. This apparatus may interact with the apparatus of FIG. 7.

At 801, the SMF receives from a network repository function a profile for at least one Proxy Call Session Control Function (P-CSCF).

At 802, the SMF selects at least one first identifier for the P-CSCF over an interface between the P-CSCF and a user equipment. In other words, the SMF may select at least one first identifier that may be used over a Gm interface.

The at least one first identifier may comprise at least one of a fully qualified domain name, an IPv6 address, and an IPv4 address. The at least one first identifier may comprise multiple identifiers for the interface between the P-CSCF and a user equipment.

The at least one first identifier may be provided with an indication that it is an identifier for the Gm interface. This indication may be provided in the form of the at least one identifier being provided in a particular/designated information element in the registration request.

To do this, the SMF may be able to distinguish between identifiers for a Gm interface in the profile and identifiers for non-interfaces in the profile. The profile may comprise at least one second identifier for the P-CSCF for use by network functions in a core network comprising the network repository function. The at least one first identifier may be different to the at least one second identifier.

The at least one first identifier may comprise at least one of a fully qualified domain name, an IPv6 address, and an IPv4 address. The at least one first identifier may comprise multiple identifiers for the interface between the P-CSCF and a user equipment.

At 803, the SMF provides the selected at least one first identifier to the user equipment.

The SMF may send a request to the network repository function to be notified when a change is made to the profile at the network repository function. This request may be sent before 801 is performed.

The SMF may send a request to the network repository function for identifying at least one P-CSCF for facilitating provision of a service to the user equipment. This request may be sent before 801 is performed.

The profile may comprise at least one of a data network name and a network slice identifier associated with the at least one first identifier. In such a case, the selecting of 802 may be performed using at least one of said data network name and network slice identifier.

The NRF may receive a discovery request for a P-CSCF from a session management function on behalf of a user equipment. In response to this discovery request, the NRF may provide the at least one first identifier to the session management function in response to the discovery request. This provision may be made in response to a selection of at least one P-CSCF provided by the NRF. For example, the selection may comprise determining which identifiers to use by using a data network name or network slice identifier associated with the SMF and with respective identifiers of a P-CSCF.

Figure 2:
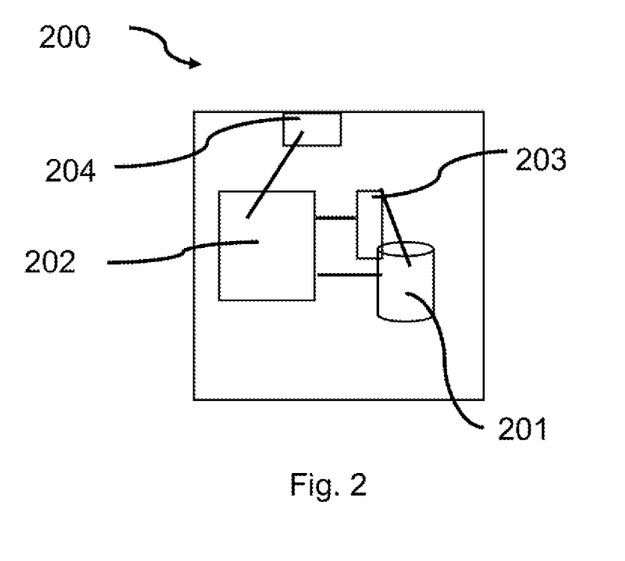
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
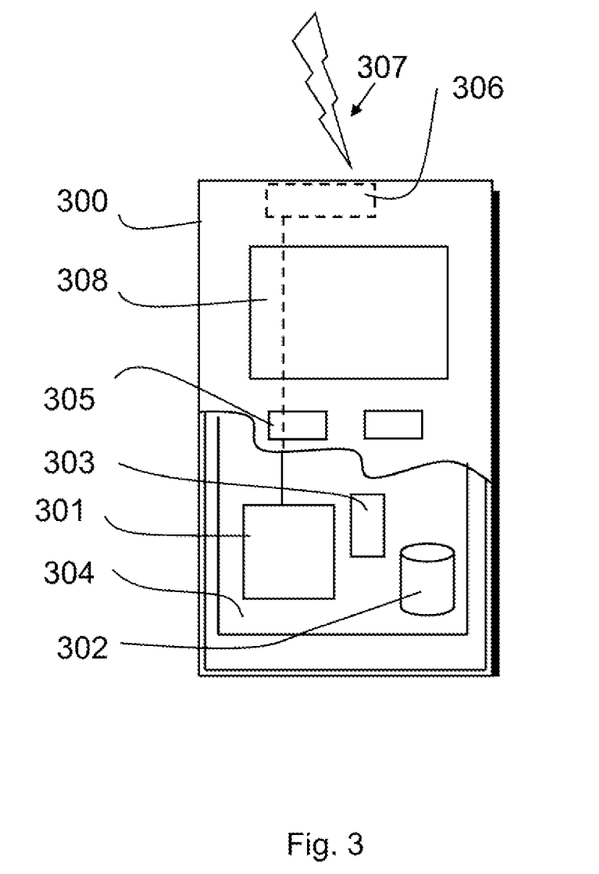
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
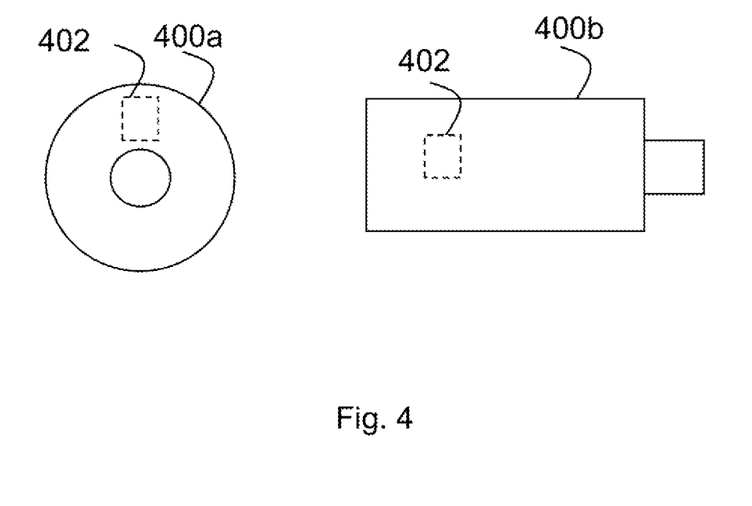
FIG. 4 shows a schematic representation of a non-volatile memory medium storing instructions which when executed by a processor allow a processor to perform one or more of the steps of the methods of some embodiments.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 10.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a Proxy Call Session Control Function (P-CSCF), the apparatus comprising:
    at least one processor; and
    at least one memory including computer program code, said at least one memory and computer program code being configured, with the at least one processor, to cause the apparatus to perform:
    sending a first registration request to a network repository function for registering the P-CSCF with the network repository function, the first registration request comprising at least one first address for the P-CSCF over an interface between the P-CSCF and a user equipment; and
    sending a second registration request to the network repository function, wherein the second registration request comprises at least one second address for the P-CSCF for use by network functions in a core network comprising the network repository function.

2. The apparatus as claimed in claim 1, wherein the first registration request is comprised within the second registration request, and wherein the at least one first address is different from the at least one second address.

3. The apparatus as claimed in claim 1, wherein the at least one first address comprises at least one of a fully qualified domain name, an IPV6 address, and an IPV4 address.

4. A method for an apparatus for a Proxy Call Session Control Function (P-CSCF), the method comprising:
    sending a first registration request to a network repository function for registering the P-CSCF with the network repository function, the first registration request comprising at least one first address for the P-CSCF over an interface between the P-CSCF and a user equipment; and
    sending a second registration request to the network repository function, wherein the second registration request comprises at least one second address for the P-CSCF for use by network functions in a core network comprising the network repository function.

5. The method as claimed in claim 4, wherein the first registration request is comprised within the second registration request, and wherein the at least one first address is different from the at least one second address.

6. The method as claimed in claim 4, wherein the at least one first address comprises at least one of a fully qualified domain name, an IPV6 address, and an IPV4 address.

7. A non-transitory computer readable medium comprising program instructions that when executed by an apparatus, cause the apparatus to perform at least the following:
    sending a first registration request to a network repository function for registering the P-CSCF with the network repository function, the first registration request comprising at least one first address for the P-CSCF over an interface between the P-CSCF and a user equipment; and
    sending a second registration request to the network repository function, wherein the second registration request comprises at least one second address for the P-CSCF for use by network functions in a core network comprising the network repository function.

8. The non-transitory computer readable medium as claimed in claim 7, wherein the first registration request is comprised within the second registration request, and wherein the at least one first address is different from the at least one second address.

9. The non-transitory computer readable medium as claimed in claim 7, wherein the at least one first address comprises at least one of a fully qualified domain name, an IPv6 address, and an IPV4 address.

10. An apparatus for a Proxy Call Session Control function (P-CSCF), the apparatus comprising:
    at least one processor; and
    at least one memory including computer program code, said at least one memory and computer program code being configured, with the at least one processor, to cause the apparatus to perform:
    sending a registration request to a network repository function for registering the P-CSCF with the network repository function, the registration request comprising at least one first address for the P-CSCF over an interface between the P-CSCF and a user equipment, and at least one second address for the P-CSCF for use by network functions in a core network comprising the network repository function,
    wherein the at least one first address is different from the at least at least one second address.

11. The apparatus as claimed in claim 10, wherein the at least one first address comprises at least one of a fully qualified domain name, an IPV6 address, and an IPv4 address.

12. A method for an apparatus for a Proxy Call Session Control Function (P-CSCF), the method comprising:

sending a registration request to a network repository function for registering the P-CSCF with the network repository function, the registration request comprising at least one first address for the P-CSCF over an interface between the P-CSCF and a user equipment, and at least one second address for the P-CSCF for use by network functions in a core network comprising the network repository function, wherein the at least one first address is different from the at least at least one second address.

13. The method as claimed in claim 12, wherein the at least one first address comprises at least one of a fully qualified domain name, an IPV6 address, and an IPV4 address.

14. A non-transitory computer readable medium comprising program instructions that when executed by an apparatus, cause the apparatus to perform at least the following:

sending a registration request to a network repository function for registering the P-CSCF with the network repository function, the registration request comprising at least one first address for the P-CSCF over an interface between the P-CSCF and a user equipment, and at least one second address for the P-CSCF for use by network functions in a core network comprising the network repository function, wherein the at least one first address is different from the at least at least one second address.

15. The non-transitory computer readable medium as claimed in claim 14, wherein the at least one first address comprises at least one of a fully qualified domain name, an IPV6 address, and an IPV4 address.

* * * * *